United States Patent [19]
Harris et al.

[11] Patent Number: 5,888,655
[45] Date of Patent: Mar. 30, 1999

[54] PRIMER COATING COMPOSITIONS CONTAINING CARBAMATE-FUNCTIONAL NOVOLAC RESINS

[75] Inventors: Paul J. Harris, West Bloomfield; Gregory G. Menovcik, Farmington Hills, both of Mich.

[73] Assignee: BASF Corporation, Southfield, Mich.

[21] Appl. No.: 884,613

[22] Filed: Jun. 30, 1997

[51] Int. Cl.$^6$ .......................... B32B 27/42; B32B 27/38; B32B 27/40; B05D 1/38
[52] U.S. Cl. .................. 428/423.1; 427/379; 427/407.1; 427/410; 428/412; 428/413; 428/414; 428/425.3; 523/416; 523/417; 523/424; 523/428; 528/93; 528/121; 528/266; 528/367; 525/442; 525/443; 525/504; 525/378; 525/379
[58] Field of Search ................................ 427/410, 407.1, 427/409, 386; 428/423.1, 425.3, 412, 413, 414; 525/442, 443, 378, 379, 504; 523/416, 417, 424, 428; 528/93, 266, 367, 121

[56] References Cited

U.S. PATENT DOCUMENTS

| | | | |
|---|---|---|---|
| 3,719,724 | 3/1973 | Freeman | 156/330 |
| 4,122,068 | 10/1978 | Meyer | 528/93 |
| 4,167,500 | 9/1979 | Jazenski et al. | 156/335 |
| 4,322,456 | 3/1982 | Martin | 427/386 |
| 4,699,936 | 10/1987 | Vasta | 523/400 |
| 4,742,169 | 5/1988 | Paul et al. | 544/388 |
| 4,748,200 | 5/1988 | Nasu | 524/591 |
| 5,235,007 | 8/1993 | Alexander et al. | 525/523 |
| 5,292,833 | 3/1994 | Grahe et al. | 525/531 |
| 5,369,190 | 11/1994 | Honig et al. | 525/433 |
| 5,532,061 | 7/1996 | Menovcik et al. | 427/384 |
| 5,639,828 | 6/1997 | Briggs et al. | 525/208 |
| 5,693,724 | 12/1997 | Green | 525/481 |
| 5,756,213 | 5/1998 | Ohrbom | 428/412 |

*Primary Examiner*—Diana Dudash
*Attorney, Agent, or Firm*—Anne Gerry Sabourin

[57] ABSTRACT

A composite coating is described. The composite comprises a substrate; one or more primer coating layers disposed on the substrate; and at least one topcoat layer disposed on the outermost primer coating layer. The outermost primer coating layer is obtained by reaction of a primer composition that includes a novolac resin having at least one carbamate group and an aminoplast resin.

16 Claims, No Drawings

PRIMER COATING COMPOSITIONS CONTAINING CARBAMATE-FUNCTIONAL NOVOLAC RESINS

FIELD OF THE INVENTION

The present invention relates to primer coating compositions and particularly to the use of carbamate-functional novolac resins in such primer coatings.

BACKGROUND AND SUMMARY OF THE INVENTION

Coating finishes, particularly exterior coating finishes in the automotive industry, generally are applied in two or more distinct layers. Often, one or more layers of primer coating composition is applied to the uncoated substrate first, followed by one or more topcoat layers. Each of the layers supplies important properties toward the durability and appearance of the composite coating. The primer coating layers may serve a number of purposes. First, the primer coating may be applied in order to promote adhesion between the substrate and the coating. Secondly, the primer coating may be applied in order to improve physical properties of the coating, such as corrosion resistance or impact strength (e.g., for improving resistance to gravel chipping). Third, the primer coating may be applied in order to improve the appearance of the coating by providing a smooth layer upon which the topcoat layers may be applied.

In the process of finishing the exterior of automobiles today, metal substrates are usually first coated with an electrocoat primer. While the electrocoat primer provides excellent surface adhesion and corrosion protection, it is often desirable to apply a second primer layer. The second primer layer may enhance the corrosion protection of the finish, but it also serves to provide a smoother surface than the electrocoat primer. This second primer layer prevents the orange peel of electrocoat surface from telegraphing through to cause the surface of the final topcoat layer to be less than the desired smoothness. The second primer also serves to provide a barrier layer between the electrocoat primer layer, which usually contains aromatic moieties and other materials that can cause yellowing on exposure to sunlight, and the topcoat. Thus, the second primer layer also helps to block low molecular weight, light sensitive species from passing from the electrocoat layer into the topcoat layers where such species could cause a shift in color (yellowing) or other problems.

December et al., U.S. Pat. No. 5,431,791, disclose an electrodeposition coating composition comprising an aqueous mixture of a resin with a plurality of acid-salted primary amines groups and a curing agent with a plurality of cyclic carbonate groups. The composition is used to electrodeposit a coating layer onto an electrically conducting substrate. The deposited layer is cured to produce a cured coating layer. Electrocoat primer is usually overcoated with a primer-surfacer and at least one topcoat layer.

A primer composition has now been discovered that comprises a carbamate-functional novolac resin and an aminoplast crosslinker such as a melamine resin crosslinker. The primer composition is used to prepare a composite coating on a substrate, wherein the composite coating comprises at least one primer layer, wherein the outermost primer layer is obtained from applying and reacting the primer composition of the invention, and at least one topcoat layer that is applied onto the outermost primer coating layer.

DETAILED DESCRIPTION

The composite coating of the composition has, as at least one layer, a primer coating layer that is obtained by reaction of a primer composition comprising a novolac resin having one or more carbamate groups and an aminoplast resin. In a preferred embodiment, the carbamate functionality of the novolac resin is primary carbamate functionality. The carbamate-functional resin preferably has at least two carbamate groups per molecule of resin, and preferably it has five or six carbamate groups per molecule, on average. The carbamate functionality may be represented by the structure:

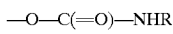

wherein R is H or alkyl, preferably of about 1 to 4 carbon atoms. Preferably, R is H or methyl, and more preferably R is H. When R is H, then the carbamate group is a primary carbamate group. In a preferred embodiment, the carbamate functionality is a β-hydroxy carbamate functionality. A β-hydroxy primary carbamate group may be represented by the structure:

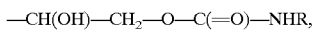

wherein R is as defined before. Again, R is preferably H or methyl, and more preferably R is H (a β-hydroxy primary carbamate group).

The novolac resins of the present invention may be obtained in several ways, for example, the novolac resin having carbamate functionality may be obtained by first reacting a novolac polyepoxide compound with carbon dioxide to form a resin having on average at least two pendant carbonate groups, and then reacting the carbonate groups with ammonia or an amino compound having at least one primary amine group. Preferably the carbamate functional novolac resin has at least two carbamate groups per molecule of resin, and more preferably at least two primary carbamate groups. It is also preferred to react the novolac polyepoxide compound with excess carbon dioxide so that each oxirane group is converted to a carbonate group, and preferably enough ammonia or primary amine groups are reacted in order to convert each carbonate group to a carbamate group. The carbamate-functional novolac resin is combined with an aminoplast crosslinker, especially with a melamine resin, to form the primer coating composition of the invention. The primer composition is used to prepare a composite coating on a substrate, with the composite coating comprising at least one primer layer and at least one topcoat layer. When there are more than one primer layers, then the outermost primer layer is obtained from applying and reacting the primer composition of the invention. The topcoat layer or layers are then applied onto the outermost primer coating layer.

The novolac epoxy resin may be epoxy phenol novolac resins or epoxy cresol novolac resins having the formula I:

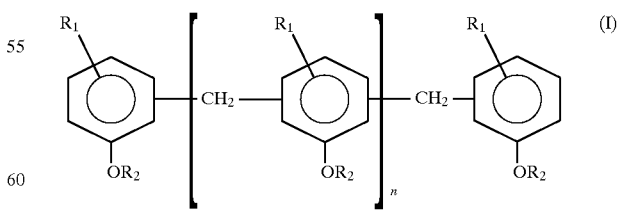

in which $R_1$ is H or methyl, $R_2$ may be H or a glycidyl group, with the proviso that on average at least two $R_2$ groups per molecule are glycidyl groups, and n is from 0 to 12, preferably from 3 to 8, and more preferably 3 or 4. The novolac resin may also be an aromatic novolac bisphenol A resin, having either the formula II

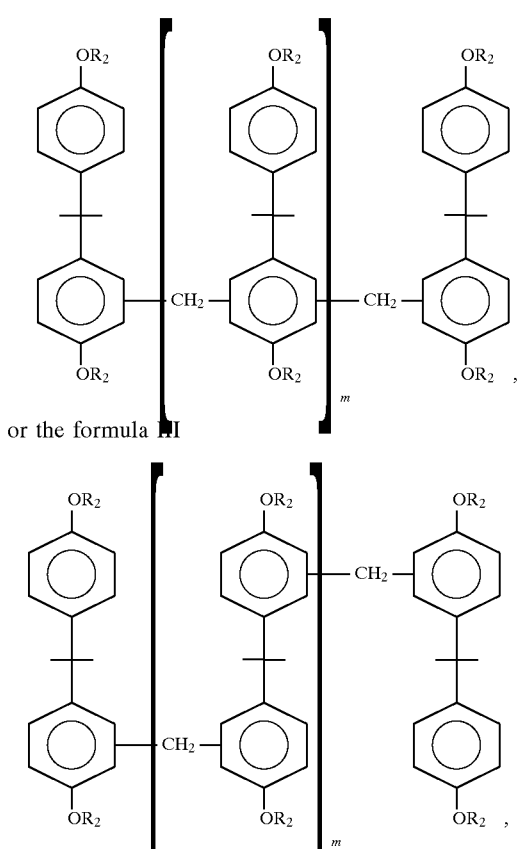

or the formula III wherein, for each formula, $R_2$ may be H or a glycidyl group, with the proviso that on average at least two $R_2$ groups per molecule are glycidyl groups, and m is from 0 to 4, preferably from 0 to 2.

Although not all of the oxirane groups must be converted, preferably all or substantially all of the oxirane groups are converted to carbonate groups. The oxirane groups can be converted to carbamate groups by a two-step synthesis. In a first step, a cyclic carbonate group is formed by reaction with carbon dioxide. This can be done at any pressure from atmospheric up to supercritical $CO_2$ pressures, but is preferably carried out under elevated pressure (e.g., 60–150 psi). The temperature for this reaction may be from about room temperature, typically about 23° C. up to about 200° C., and preferably is from above about 60° and below about 150° C. Useful catalysts include any that activate an oxirane ring, such as tertiary amine or quaternary salts, such as tetramethyl ammonium bromide; combinations of complex organotin halides and alkyl phosphonium halides, such as $(CH_3)_3SnI$, $Bu_3SnI$, $Bu_4PI$, and $(CH_3)_4PI$; potassium salts such as potassium carbonate and potassium iodide, preferably in combination with crown ethers, tin octoate, or calcium octoate; and the like. Mixtures may also be employed.

In the second step of the synthesis of carbamate groups from oxirane groups, the cyclic carbonate groups formed in the first step can be converted to carbamate groups by reaction with ammonia or a primary amine, which ring opens the cyclic carbonate to form a β-hydroxy carbamate. Suitable amino compounds have one primary amine group, including, without limitation, methyamine, ethylamine, n-propylamine, n-butylamine, other alkylamines, and mixtures of these. Amino compounds having one primary amine group and a different functional group, such also alkanolamines, are also suitable. Examples include, without limitation, ethanolamine and isopropylamine. When ammonia is reacted with the cyclic carbonate groups, the reaction is usually carried out by introducing a stream of ammonia into the reaction mixture at atmospheric pressure and mild temperatures, for example up to about 50° C. When a primary amine, mixture of primary amines, or mixture of primary amine with ammonia is reacted with the cyclic carbonate groups, the reaction may be carried out up to about the boiling point of the primary amine.

The carbamate functional novolac resin will generally have a number average molecular weight of from about 1000 to about 40,000, preferably from about 2000 to about 10,000, and even more preferably from about 4000 to about 5000. The molecular weight can be determined by gel permeation chromatography using a polystyrene standard. The carbamate equivalent weight will generally be between about 200 and 1500, and more preferably it will fall between about 300 and 340.

The compositions of the present invention include aminoplast resins. Suitable aminoplast resins are amine/aldehyde condensates, preferably at least partially etherified, and most preferably fully etherified. Melamine and urea are preferred amines, but other triazines, triazoles, diazines, guanidines, or guanamines may also be used to prepare the alkylated amine/aldehyde aminoplast resins crosslinking agents. The aminoplast resins are preferably amine/formaldehyde condensates, although other aldehydes, such as acetaldehyde, crotonaldehyde, and benzaldehyde, may be used. Nonlimiting examples of preferred aminoplast resins include monomeric or polymeric melamine formaldehyde resins, including melamine resins that are partially or fully alkylated using alcohols that preferably have one to six, more preferably one to four, carbon atoms, such as hexamethoxy methylated melamine; urea-formaldehyde resins including methylol ureas and siloxy ureas such as butylated urea formaldehyde resin, alkylated benzoguanimines, guanyl ureas, guanidines, biguanidines, polyguanidines, and the like. Monomeric melamine formaldehyde resins are particularly preferred. The preferred alkylated melamine formaldehyde resins are commercially available, for example from Monsanto Corp., St. Louis, Mo., under the trademark RESIMENE or from Cytec Industries, West Patterson, N.J., under the trademark CYMEL.

The melamine resin preferably comprises from about 15% by weight to about 40% by weight, and more preferably from about 20% by weight to about 30% by weight, a particularly preferably about 35% by weight of of the primer composition, based upon the combined weight of melamine resin and carbamate functional acrylic resin. One preferred ratio of equivalents is from 1:1 up to 1:1.2 equivalents of carbamate groups to crosslinker reactive groups.

The compositions may include one or more catalysts. Useful catalysts include, without limitation, blocked acid catalysts, such as para-toluene sulfonic acid, dodecylbenzene sulfonic acid, dinonylnaphthylene disulfonic acid, and so on, and particularly these acids blocked with a group that volatilized during the curing reaction. Preferred among these are blocked dodecylbenzene sulfonic acids. Mixtures may also be employed.

Although the coating compositions of the present invention may be used as powder coatings, the coating compositions preferably further include organic solvents. In one highly preferred embodiment, the compositions are solvent-borne coating compositions. The solvent may be present in an amount of from about 15 percent to about 99 percent by weight, preferably from about 20 percent to about 80 percent by weight, and more preferably from about 20 percent to about 50 percent by weight.

The selection of particular solvents may be made according to methods well-known in the art. The optimum solvent or mixture of solvents may be arrived at by straightforward testing of the particular mixture. In general, useful solvents will include, without limitation, esters, particularly acetates, propionates, and butyrates; alcohols, ketones, aromatic solvents, glycol ethers and esters, aprotic amides, aprotic sulfoxides, and aprotic amines. Nonlimiting examples of useful solvents include acetone, methyl ethyl ketone, methyl propyl ketone, methyl isobutyl ketone, amyl acetate, butyl acetate, ethylene glycol butyl ether, propylene glycol methyl ether, propylene glycol methyl ether acetate, xylene, toluene, methanol, ethanol, isopropanol, butanol, naphtha and other blends of aromatic hydrocarbons, N-methylpyrrolidone, isobutyl isobutyrate, and water. Mixtures may also be employed.

Aqueous coating compositions of the invention may contain one or more organic solvents in addition to the water, which may be used to enhance dispersion or emulsion stability. The resin may be modified to contain nonionic stabilizing groups or acid or amine groups that may be salted to stabilize a dispersion or emulsion of the resin. Preferably, coating compositions of the invention are nonaqueous and preferably the resin of the invention has functional groups selected exclusively from oxirane, carbonate, carbamate, and hydroxy carbamate groups, particularly primary carbamate or hydroxy carbamate groups.

The primer coating compositions of the present invention preferably include one or more pigments. Pigments may be included in the composition for decorative effect, for example in order to approximately match the color of the primer to the basecoat or topcoat color in order to make stone chips less noticeable. Pigments may also commonly be included in the compositions to enhance the corrosion protection properties of the coating. Pigments are usually added in an amounts that result in a pigment-to-binder ratio of from about 0.5:1 to about 1.5:1, and preferably from about 0.8:1 to about 1:1. Typical inorganic pigments include metal oxides, chromates, molybdates, phosphates, and silicates. The compositions often include carbon and/or various organic pigments for coloring and other purposes. Some pigments that are useful in the coating compositions of the invention include titanium dioxide, barium sulfate, aluminum phosphomolybdate, carbon black, red iron oxide, strontium chromate, lead chromate, lead oxide, zinc phosphate, talc, barytes, lead molybdate, basic lead silicate, quinacridones, and phthalocyanines.

The pigments are usually first dispersed in a pigment paste by grinding the pigments to a certain fineness in a medium that typically includes one or more resins or polymeric dispersants, along with organic solvents. The grinding serves the purposes of breaking apart the agglomerated particles in the dry pigment and closely associating the pigment particles with the grinding resin or dispersant compound. The pigments are generally dispersed with resins, preferably with resin compositions including the carbamate-functional acrylic or the melamine resin of the invention, or dispersants and solvent to form pigment pastes using equipment, such as attritors and sand mills, and methods widely used in the art.

Other conventional materials, such as dyes, flow control or rheology control agents such as thixotropes, conductive materials and so on may be added to the compositions.

The coating compositions of the present invention can be applied over many different substrates, including wood, metals, glass, cloth, plastic, foam, metals, and elastomers. They are particularly preferred as primers on automotive articles, such as metal bodies or elastomeric fascia. When the article is a metallic article, it is preferred to have a layer of electrocoat primer before application of the primer coating composition of the invention.

The primer coating composition of the invention is applied directly to the substrate or over one or more other layers of primer, such as the electrocoat primer. The applied primer coating composition is then cured to form a primer coating layer. The primer coating layer formed from the primer coating composition of the invention is the outermost primer layer of the composite coating. A topcoat composition is applied over the primer coating layer and cured to form a topcoat layer. the substrate at that point is then covered with a composite coating that has at least one layer of primer coating derived from the inventive compositions and at least one layer of topcoat.

In a preferred embodiment, the coating composition of the present invention is overcoated with a topcoat system applied as a color-plus-clear (basecoat-clearcoat) topcoat. Crosslinking compositions are preferred as the topcoat system. Coatings of this type are well-known in the art. For example, the topcoat is preferably a clearcoat containing a vehicle having carbamate functionality, as for example a clearcoat according to U.S. Pat. No. 5,474,811, applied wet-on-wet over a layer of a basecoat composition. Suitable pigmented color coat or basecoat compositions are well-known in the art. Polymers known in the art to be useful in basecoat and clearcoat compositions include, without limitation, acrylics, vinyl, polyurethanes, polycarbonates, polyesters, alkyds, and polysiloxanes. Acrylics and polyurethanes are preferred. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above.

Each layer of the composite coatings of the invention can be applied to an article to be coated according to any of a number of techniques well-known in the art. These include, for example, spray coating, dip coating, roll coating, curtain coating, and, the like. If an initial electrocoat primer layer is applied to a metallic substrate, the electrocoat primer is applied by electrodeposition. For automotive applications, the primer coating composition of the invention and the topcoat layer or layers are preferably applied by spray coating, particularly electrostatic spray methods. Coating layers of a mil or more are usually applied in two or more coats, separated by a time sufficient to allow some of the solvent to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

The outermost primer layer, which is formed by reacting the primer compositions of the invention, is reacted before the topcoat is applied. Preferably, the reaction results in a cured coating. Color-plus-clear topcoats are usually applied over the primer layer wet-on-wet. That is, the color and clear compositions are applied in coats separated by a flash, as described above, with a flash also between the last coat of the color composition and the first coat the clear. The two coating layers are then cured simultaneously. Preferably, the cured base coat layer is 0.5 to 1.5 mils thick, and the cured clear coat layer is 1 to 3 mils, more preferably 1.6 to 2.2 mils, thick.

The coating compositions described are preferably cured with heat. Curing temperatures are preferably from about 70° C. to about 180° C., and particularly preferably from about 170° F. to about 200° F. for a composition including an unblocked acid catalyst, or from about 240° F. to about 275° F. for a composition including a blocked acid catalyst. Typical curing times at these temperatures range from 15 to 60 minutes at cure temperature, and preferably the temperature is chosen to allow a cure time of from about 15 to about 30 minutes. In a preferred embodiment, the coated article is an automotive body or part.

The invention is further described in the following examples. The examples are merely illustrative and do not in any way limit the scope of the invention as described and claimed.

EXAMPLES

Example 1
Preparation of Novolac Epoxy Carbamate

A round-bottom glass flask equipped with a stirrer was charged with 1667.5 grams of a commercial epoxy novolac resin (3.6 epoxide groups per molecule on average, obtained from Ciba Geigy Corp., Hawthorne, N.Y.), 30.0 grams of tetrabutylammonium bromide, and 565.8 grams of monomethyl ether of propylene glycol. The contents of the flask were held for six hours at temperatures between about 101° to about 107° C. under a pressurized atmosphere of carbon dioxide (120 psi). The product of carbonated novolac epoxy was reduced to 71% nonvolatiles with 337.3 grams acetone.

A round-bottom glass flask equipped with a stirrer was charged with 800 grams of the solution of carbonated novolac epoxy and 200 grams of methanol. A gentle stream of ammonia was bubbled into the polymer solution for four hours, with an exotherm peak at 33° C. An infrared spectroscopy scan indicated that the reaction between carbonate and amine was complete. The flask was purged with nitrogen. The polymer solution was mixed with about 3 ml of water and then heated to distill off the methanol and acetone, and 197 grams of distillate were recovered. The carbamate-functional product was 61% nonvolatile.

Example 2
Coating Films Containing Carbamate Novolac and Melamine Crosslinking Agent The carbamate-functional novolac of Example 1 was formulated into coating compositions using two different melamine resins and three different ratios of melamine resin to novolac resin.

|  | A | B | C | D | E | F |
|---|---|---|---|---|---|---|
| Novolac of Example 1 | 139.3 g | 131.1 g | 122.9 g | 139.3 g | 131.1 g | 122.9 g |
| RESIMENE 717[1] | 17.9 | 23.8 | 29.8 | | | |
| RESIMENE 755[1] | | | | 15.0 | 20.0 | 29.8 |
| additive[2] | 0.25 | 0.25 | 0.25 | 0.25 | 0.25 | 0.25 |
| catalyst[3] | | | | 5.4 | 5.4 | 5.4 |
| EGBE[4] | 36.2 | 38.5 | 40.7 | 36.4 | 39.5 | 42.7 |

[1]Available from Monsanto Corp., St. Louis, MO.
[2]A 60% by weight solution of polybutyl acrylate in xylene
[3]A solution of isopropylamine-blocked dodecylbenzene sulfonic acid
[4]Ethylene glycol monobutyl ether The coating compositions A–C were applied to electrocoated phosphated steel panels by spray application. Two panels were prepared for each sample. One panel was baked for 20 minutes at 270° F.; the second panel was baked for 25 minutes at 325° F. The coated panels were then tested according to the following test methods: Tukon hardness, ASTM D 1475 (method A); Tape Adhesion, ASTM D 3359; and gravel chip test, ASTM D 3170 and SAE J400.

Bake: 20' @ 270° F.

| Test | A | B | C |
|---|---|---|---|
| film thickness | 1.0 | 1.0 | 1.0 |
| Tukon hardness | 18.92 | 19.42 | 18.92 |
| Tape adhesion (% removal) | 95P | 95P | 95P |
| gravel test rating | 0 | 1 | 1 |

Bake: 25' @ 325° F.

|  | A | B | C |
|---|---|---|---|
| film thickness | 1.0 | 1.0 | 1.1 |
| Tukon hardness | 28.02 | 28.02 | 29.85 |
| ICA (% removal) | <1 | <1 | <1 |
| gravel test rating | 7 | 7 | 7 |

The invention has been described in detail with reference to preferred embodiments thereof. It should be understood, however, that variations and modifications can be made within the spirit and scope of the invention.

What is claimed is:

1. A composite coating, comprising a substrate; at least one primer coating layer disposed on said substrate; and at least one topcoat layer disposed on the outermost primer coating layer; wherein said outermost primer coating layer is obtained by the reaction of a primer composition comprising:

(a) a novolac resin having carbamate groups and (b) an aminoplast resin, wherein the novolac resin is obtained by:

(1) reacting a novolac epoxy selected from the group consisting of

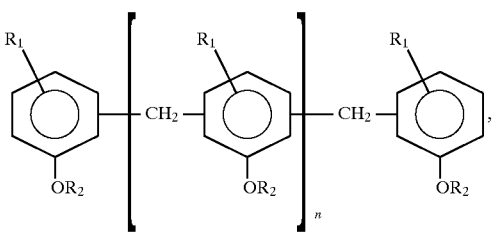

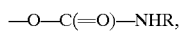

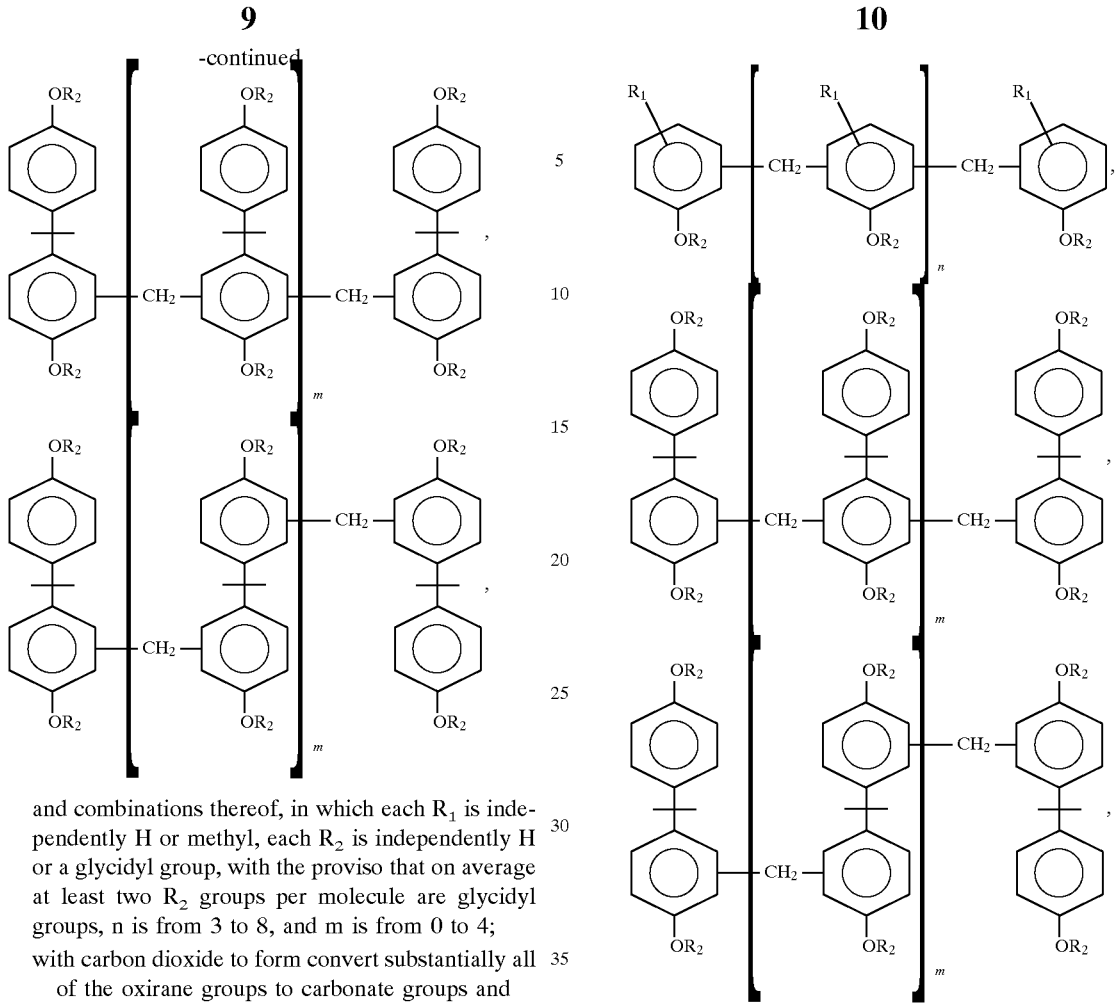

and combinations thereof, in which each $R_1$ is independently H or methyl, each $R_2$ is independently H or a glycidyl group, with the proviso that on average at least two $R_2$ groups per molecule are glycidyl groups, n is from 3 to 8, and m is from 0 to 4;

with carbon dioxide to form convert substantially all of the oxirane groups to carbonate groups and (2) reacting said carbonate groups with at least one member of the group consisting of ammonia, primary amines, and mixtures thereof to produce carbamate functional groups having the structure

—O—C(=O)—NHR, in which R is H or alkyl.

2. A composite coating according to claim 1, wherein the novolac resin comprises at least one carbamate group for which R is H.

3. A composite coating according to claim 1, wherein the novolac resin has an average of at least two carbamate groups per molecule of said resin.

4. A composite coating according to claim 1, comprising an electrocoat primer layer in between the substrate and the outermost primer coating layer.

5. A composite coating according to claim 1, comprising as a topcoat system an inner layer of basecoat and an outer layer of clearcoat.

6. A coating composition, comprising (a) a novolac resin having carbamate groups; and (b) an aminoplast resin, wherein the novolac resin is obtained by:

(1) reacting a novolac epoxy selected from the group consisting of and combinations thereof, in which each $R_1$ is independently H or methyl, each $R_2$ is independently H or a glycidyl group, with the proviso that on average at least two $R_2$ groups per molecule are glycidyl groups, n is from 3 to 8, and m is from 0 to 4;

with carbon dioxide to form convert substantially all of the oxirane groups to carbonate groups and (2) reacting said carbonate groups with at least one member of the group consisting of ammonia, primary amines, and mixtures thereof to produce carbamate functional groups having the structure

—O—C(=O)—NHR, in which R is H or alkyl.

7. A composite coating according to claim 1, wherein said aminoplast resin comprises a melamine resin.

8. A composite coating according to claim 1, wherein said compound from step 2 is ammonia.

9. A composite coating according to claim 1, wherein said novolac resin essentially reacts through said carbamate groups in forming the outermost primer coating layer.

10. A method of coating a substrate, comprising the steps of:

(a) applying a primer coating composition, said primer coating composition comprising a novolac resin having at least one carbamate group and an aminoplast resin; wherein the novolac resin is obtained by:

(1) reacting a novolac epoxy selected from the group consisting of

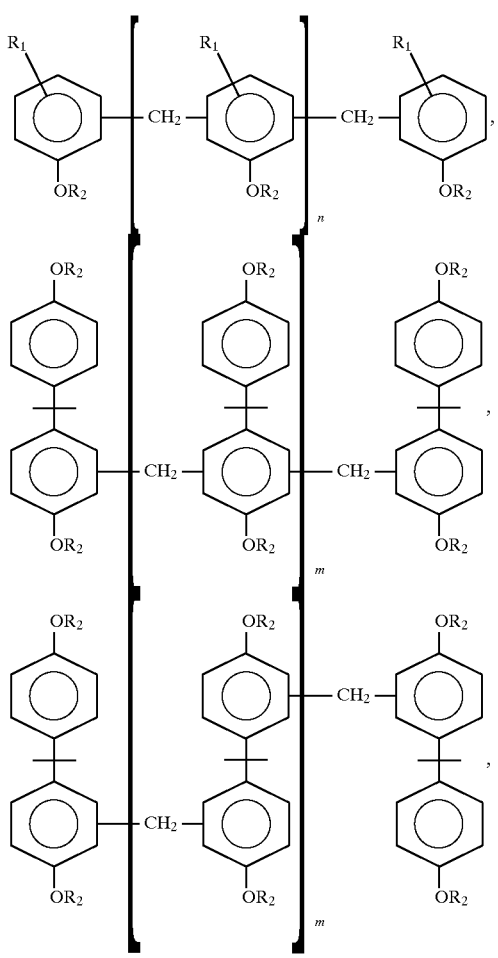

and combinations thereof, in which each $R_1$ is independently H or methyl, each $R_2$ is independently H or a glycidyl group, with the proviso that on average at least two $R_2$ groups per molecule are glycidyl groups, n is from 3 to 8, and m is from 0 to 4; with carbon dioxide to form convert substantially all of the oxirane groups to carbonate groups and (2) reacting said carbonate groups with at least one member of the group consisting of ammonia, primary amines, and mixtures thereof to produce carbamate functional groups having the structure

—O—C(=O)—NHR, in which R is H or alkyl;

(b) curing the applied primer coating composition to form a primer coating layer;

(c) applying a topcoat composition over the primer coating layer; and (d) curing the applied topcoat composition to form a topcoat layer.

11. A method according to claim 10, wherein the primer coating composition is applied over an electrocoat primer layer.

12. A method according to claim 10, wherein the topcoat composition is applied in at least a two layer system comprising a clearcoat layer wet-on-wet over a basecoat layer.

13. A method according to claim 10, wherein the novolac resin comprises at least one carbamate group for which R is H.

14. A method according to claim 10, wherein said aminoplast resin comprises a melamine resin.

15. A method according to claim 10, wherein said compound from step 2 is ammonia.

16. A method according to claim 10, wherein said novolac resin essentially reacts through said carbamate groups in forming the outermost primer coating layer.

* * * * *